United States Patent [19]

Kobayashi

[11] 4,319,656

[45] Mar. 16, 1982

[54] STEERING MECHANISM FOR SNOW VEHICLES

[75] Inventor: Takashi Kobayashi, Hamamatsu, Japan

[73] Assignee: Yamaha Hatsudoki Kabushiki Kaisha, Iwata, Japan

[21] Appl. No.: 119,652

[22] Filed: Feb. 8, 1980

[51] Int. Cl.³ .................. B62B 17/04; B62M 27/02
[52] U.S. Cl. .................................. 180/182; 180/190; 280/16; 280/21 R
[58] Field of Search ............... 180/182, 183, 190, 191, 180/192, 193, 194, 195; 280/16, 21 R, 25, 26, 276, 269, 92, 93, 668

[56] References Cited

U.S. PATENT DOCUMENTS 3,398,970 8/1968 Horiuchi .................. 280/16
3,931,862 1/1976 Cote ....................... 180/190
3,977,485 8/1976 West et al. ............... 280/21 R Primary Examiner—Joseph F. Peters, Jr.
Assistant Examiner—Donn McGiehan
Attorney, Agent, or Firm—Donald D. Mon

[57] ABSTRACT

The steering ski of a snow vehicle such as a snowmobile, is mounted to the lower end of a downwardly-extending support member such as a strut. The ski is mounted by a bearing which enables it to be rotated for steering purposes independently of the support member, thereby reducing the complexity of the assembly and facilitating steering.

7 Claims, 5 Drawing Figures

STEERING MECHANISM FOR SNOW VEHICLES

FIELD OF THE INVENTION

The present invention relates to a steering mechanism for a snowmobile having a steering ski and an endless drive track.

BACKGROUND OF THE INVENTION

A snowmobile having a steering ski and an endless drive track according to the prior art is equipped with a steering mechanism of the type in which the steering ski is supported through a leaf spring so that the ski and spring may be turned together clockwise and counter-clockwise. The conventional steering mechanism using the leaf spring has a disadvantage that the steering ski has its transverse rigidity so deteriorated that it is liable to experience a transversely falling phenomenon, when it is abruptly turned.

With this in mind, the present invention contemplates a steering mechanism in which a steering ski is mounted to the lower end of a supporting member which in turn is mounted to the chassis of a snowmobile in a manner to move up and down so that the supporting member is biased to return downward, and so that the steering ski and the supporting member are turned together clockwise and counter-clockwise. For example, there is disclosed a strut type suspension system, in which a strut is received in an outer cylinder fixed to the chassis so that it extends through the outer cylinder while being rotatable and movable up and down, in which the steering ski is mounted to the strut, and in which the strut is supported elastically by means of a suspension spring. In this invention, the upper end of the strut is supported rotatably with respect to the chassis so that the steering operation is performed by integrally turning the strut and the steering ski.

Therefore, in a suspension system having a supporting member such as a strut rotatable together with a steering ski, the rotations take place not only at the sliding portion for receiving the supporting member in a manner to rotate and move up and down, but also between the leaf spring and the chassis whereby to increase the frictional resistance due to the rotations so that an accordingly increased force is required for operating the steering handle with the resultant disadvantage that the handling becomes heavy.

BRIEF DESCRIPTION OF THE INVENTION

The present invention therefore contemplates to eliminate the foregoing disadvantages and to provide a steering mechanism for a snow vehicle, which mechanism can reduce the force required for turning the steering handle so that the handling can be lightened. In order to attain those objectives, there is provided a snowmobile which is constructed to include a supporting member mounted to the chassis of the snow vehicle in a manner to move up and down and biased to return downward, and a steering ski mounted to the lower end of the supporting member in a manner to turn clockwise and counter-clockwise about the supporting member.

The above and other features of this invention will be fully understood from the following detailed description and the accompanying drawings, in which:

DETAILED DESCRIPTION OF THE INVENTION

Figure 1:
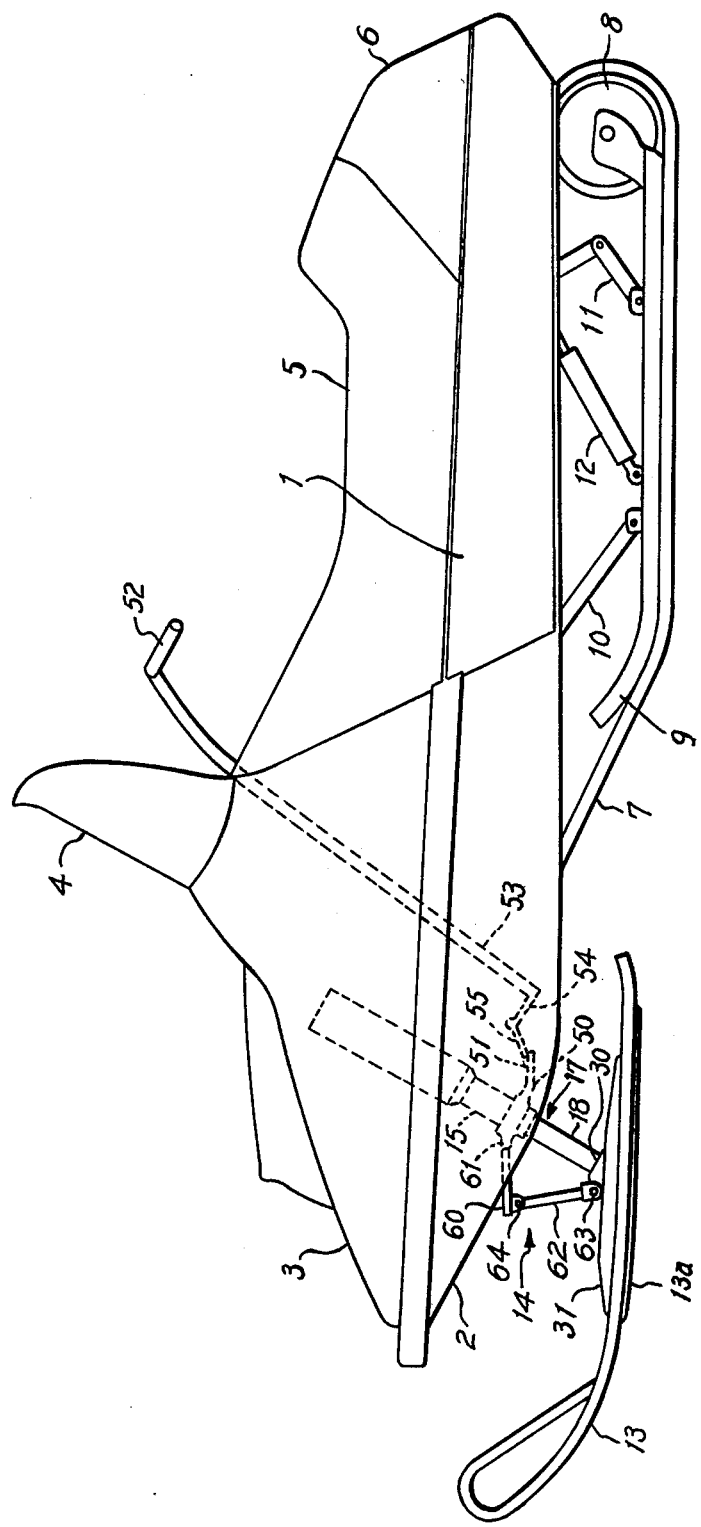
FIG. 1 is a side elevation showing a snowmobile to which one embodiment of the present invention is applied.

Indicated at reference numerals 1, 2 and 3 in FIG. 1 are a chassis of a snowmobile, a bottom cover covering the lower front side of the chassis 1, and a shroud likewise covering the upper front side of the same, respectively. A windshield 4, a seat 5, a luggage box 6, an endless drive track 7, a guide wheel 8 for making the drive track 7 run thereon under a backward tension, and a slide rail 9 respectively are also shown. Slide rail 9 is mounted to chassis 1 through links 10 and 11 and a shock absorber such that it elastically holds the endless drive track 7 while being in sliding contact with the inner side of the drive track 7. The front end of drive track 7 is made to run on a sprocket wheel (not shown) so that the driving force of a prime mover (not shown) is transmitted to drive track 7 through a centrifugal type, stepless reduction mechanism and the sprocket wheel.

A pair of steering skis 13 are disposed below bottom cover 2. The steering skis thus disposed are elastically supported on a strut type suspension system 14, as will be described later, so as to be movable up and down, and are also adapted to be turned clockwise and counter-clockwise by means of a steering handle 52, as will also be described later, so that their steering angle may be varied. Incidently, steering skis 13 have their running surfaces covered with runners 13a of metal.

Figure 2:
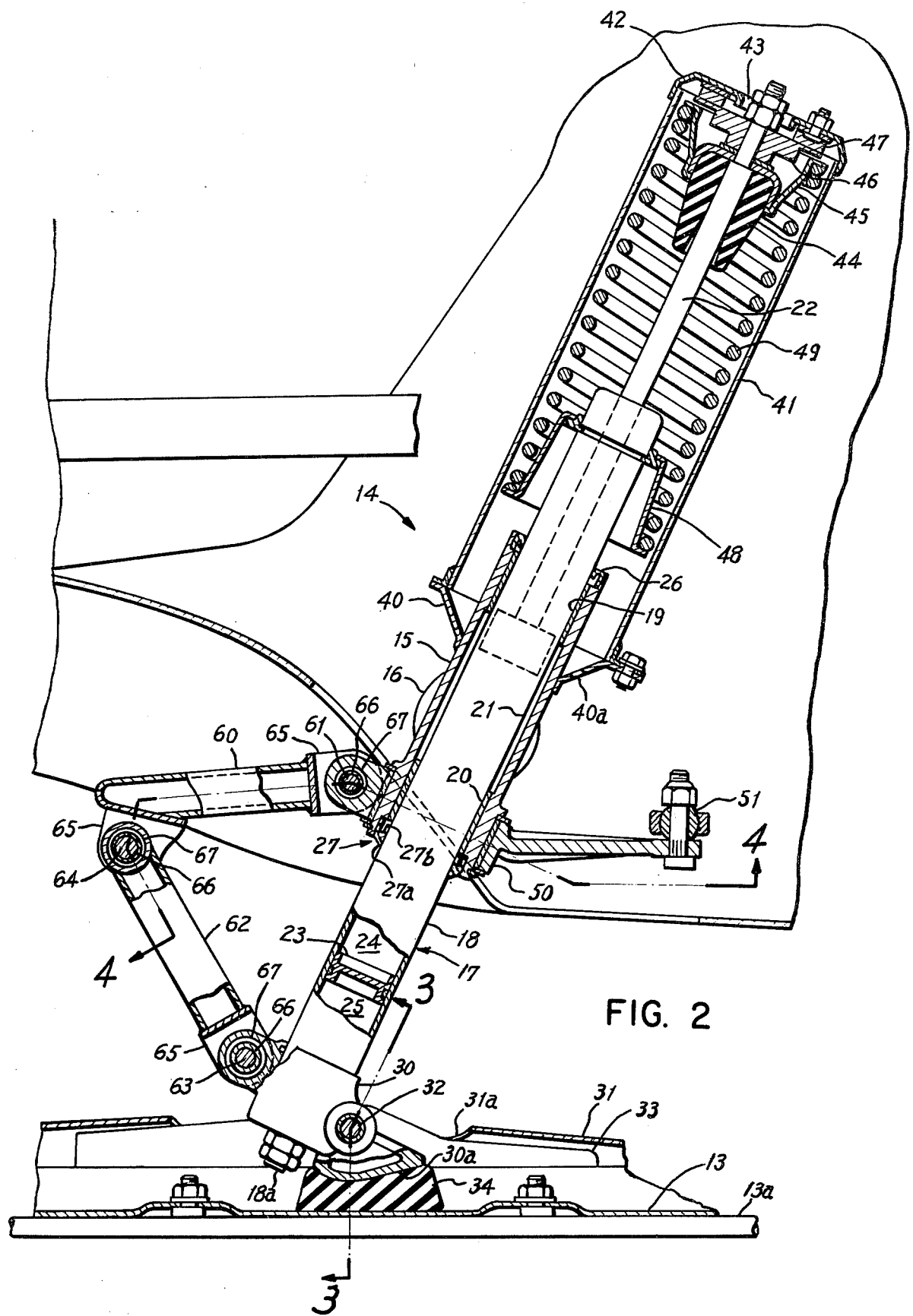
FIG. 2 is a partially sectional side elevation showing an essential portion of the snowmobile of FIG. 1.
Figure 3:
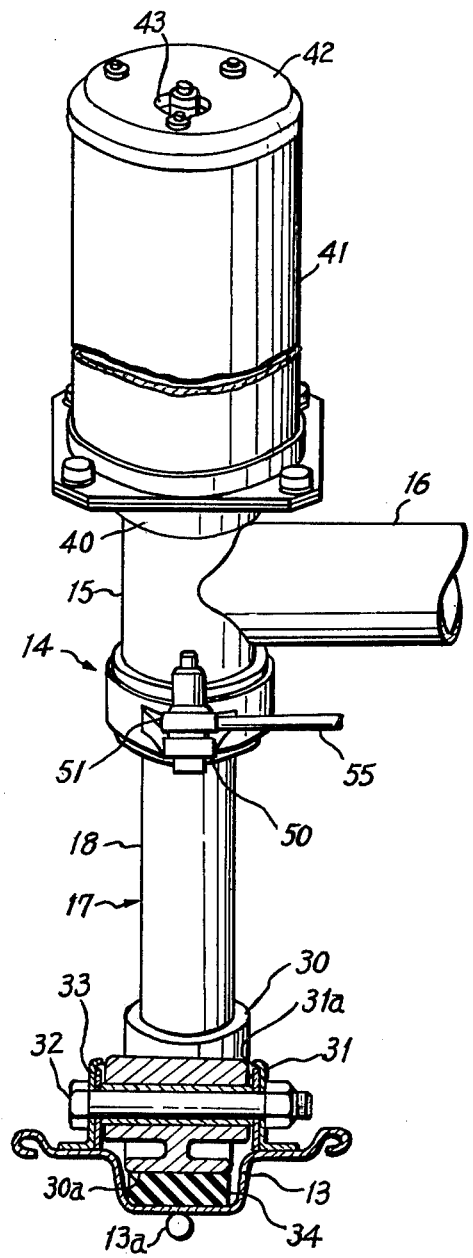
FIG. 3 is a perspective rear elevation having its portion shown in section along line 3—3 in FIG. 2.

As better shown in FIGS. 2 and 3, the strut type suspension system 14 is received in an outer cylinder 15 which is fixed to the forward extension of the aforementioned chassis 1. The outer cylinder 15 is fixed to both ends of a transverse member 16 that constitutes a portion of chassis 1 while extending in the transverse direction, so that its center axis has its upper portion inclined slightly backward.

A cylindrical shock absorber 17 is received to extend through the outer cylinder 15 so that it can slide up and down within the outer cylinder 15. The shock absorber 17 thus received constitutes a strut acting as a supporting member which is operative to support the steering skis 13 for up and down movement. Shock absorber 17 is retained in a pair of upper and lower bearings 19 and 20 so that cylinder 18 sometimes called a plunger can move up and down along a steering axis. As a result, a grease chamber 21 is formed between the inner side of the outer cylinder 15 and the outer side of the cylinder 18, and its longitudinal extension is limited by bearings 19 and 20.

Shock absorber 17 as thus constructed is of the gas-charged type and is mounted to have its piston rod 22 extending upward. As a result, a free piston 23 disposed in cylinder 18 is positioned below shock absorber 17. A gas chamber 25, separated from an oil chamber 24 by piston 23, is positioned at a lower end portion of the shock absorber 17. The gas chamber 25 thus positioned is charged with nitrogen gas under high pressure so that the increment in the capacity of the oil chamber 24 in accordance with the entrance of the piston rod 22 into the cylinder 18 may be compensated by the downward movement of the free piston 23, and so that the piston rod 22 may be preloaded in its extending direction. On the inner sides at the upper and lower ends of the aforementioned outer cylinder 15, there are mounted a pair of seal members 26 and 27, respectively, which are operative to seal the clearances between outer cylinder 15 and cylinder 18. Seal member 27 at its lower end is equipped with a downwardly extending lip 27a for repelling ice and with an upwardly extending lip 27b for sealing oil. Thus, even though the lower portion of cylinder 18 is exposed to the outside from the outer cylinder 15 so that the exposed portion is liable to be attacked by snow or ice, especially while the snowmobile is parked, the ice repelling lip 27a will scrape away the snow or ice at the beginning of the running of the snowmobile so that the oil sealing lip 27b can be protected from being broken by snow or ice which might otherwise stick and attack the latter lip 27b. As a result, the durability of the seal member 27 can be improved. On the other hand, cylinder 18 can enjoy an excellent cooling property because its portion constituting the gas chamber 25 is exposed to the outside temperatures. More specifically, the temperature of the shock absorber 17 is raised during the running operation. The volumetric expansion of the nitrogen gases as a result of the temperature rise is remarkably higher than that of the oil. By cooling the gas chamber filled up with the nitrogen gas, therefore, there can be attained the advantage that the variation in the preload to be exerted upon the piston rod 22 as a result of the temperature variation of the oil can be minimized.

The aforementioned steering skis 13 are mounted to the lower end of the cylinder 18 so that they can rotate clockwise and counter-clockwise and swing up and down. At the lower end of the cylinder 18, there is a downwardly protruding support shaft 18a, to which a bracket 30 is mounted through thrust ball bearings 28 and 29 in a manner to rotate clockwise and counter-clockwise.

A cover 31 which has its section formed into a generally inverted dome shape is fixed to skis 13. Bracket 30 is pivotally mounted on a transverse pivot pin 32 within an opening 31a which is formed in the cover 31 so that the skis 13 can swing up and down about the pivot pin 32. Between cover 31 and bracket 30 there is interposed a reinforcing plate 33 which in turn is fixed to the inner side of the cover 31. On the other hand, lower side 30a of bracket 30 bulges downwardly. An elastic member is sandwiched between lower side 30a of bracket 30 and the inner sides of skis 13. As a result, the skis 13 are biased to return to their horizontal positions. Indicated at reference numerals 35 and 36 are oil seals which are disposed above and below the thrust ball bearings 28 and 29, respectively, so that the oil may be prevented from flowing out of bearing 28, 29, while preventing water or sand from stealing into the same bearings 28 and 29.

There is fixed to the outer circumferential surface of the aforementioned outer cylinder 15 a generally funnel-shaped flange 40 which diverges upwardly, and to which is connected the lower end of a cylindrical housing 41.

Flange 40 is formed with a hole 40a for an air vent and for water drainage. To the upper end of the cylindrical housing 41, there is welded a cover member 42 whose center is formed with an opening 43 receiving the upper end of the aforementioned piston rod 22. To the upper end portion of piston rod 22 there is fixed a flanged support member 46 through a stopper 44 of an elastic material and a spring seat 45. Support member 46, thus fixed, is further fixed to the inner side of the aforementioned cover member 42 through an elastic member 47 which in turn is fixed to the upper side of support member 46. Elastic member 47 has two functions, namely to absorb the shocks which are transmitted from the piston rod 22 to the cover member 42 at the side of the chassis, and to absorb the slight offset of the piston rod 22 relative to the opening 43 of the cover member 42. At the upper end of the aforementioned cylinder 18, there is disposed a spring seat 48 which interposes a coil-shaped compression spring 49 with the spring seat 45 at the side of the aforementioned piston rod 22. Since this piston rod 22 is mounted to chassis 1 through structure 41, 40, 15 and 16, functionally compression spring 49 is sandwiched (compressively opposed) between the cylinder 18 and the chassis 1.

Indicated at reference numeral 50 is a steering arm which is rotatably held on the outer circumference of a lower portion of the aforementioned outer cylinder 15. Steering arm 50 has a portion extending backwardly to carry a ball jount 51 at its back extremity. The aforementioned steering handle 52 is equipped with a handle column 53, at the lower end of which is fixed a steering lever 54. Connection is established by a tie rod 55 between the rotatable end of the steering lever 54 and the ball joint 51 of the aforementioned steering arm 50.

To the front side of steering arm 50 there is pivotally connected a link 60 which has a pivot pin 61 arranged at a right angle with respect to the center axis of the shock absorber 17 and substantially parallel to pivot pin 32 of steering skis 13. Another link 62 is pivotally connected through a pivot pin 63 to the front side of bracket 30, which is rotatably mounted to the lower end of the aforementioned shock absorber 17. Links 60 and 62 are connected by means of a pivot pin 64. Pivot pins 63 and 64 are parallel to pivot pin 61.

Figure 4:
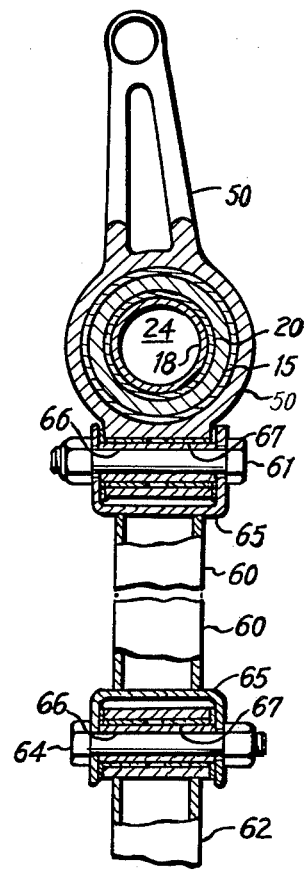
FIG. 4 is a section taken along line 4—4 in FIG. 2.
Figure 5:
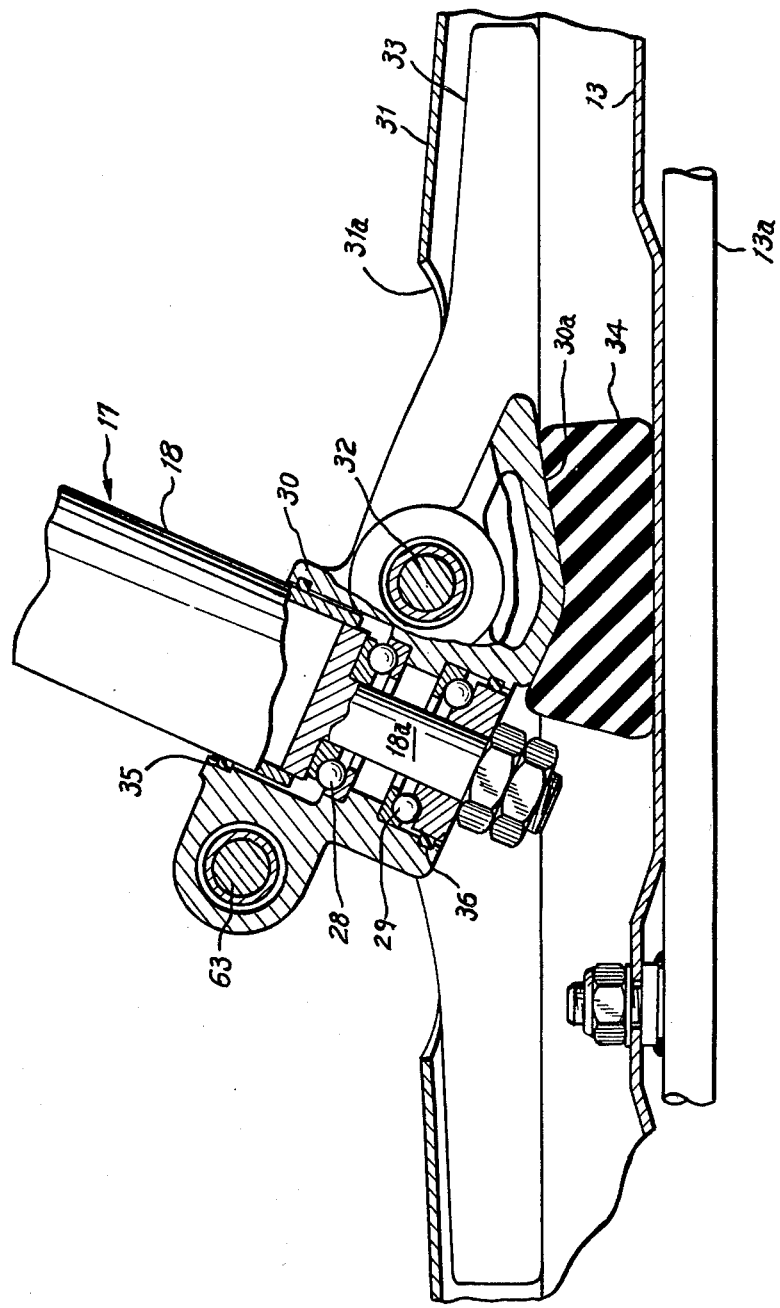
FIG. 5 is an enlarged side elevational section showing a portion of the snowmobile of FIG. 1.

The details of the construction, including pivot pins, 61, 63 and 64 is shown in FIG. 4, in which: pivot pin 63 is shown having a construction similar to those of the other pivot pins 61 and 64, although not shown. Indicated at reference numeral 65 in FIG. 4 are connecting members which have a generally C-shaped section, and which are welded to both ends of link 60 and to one end of link 62. Indicated at numeral 66 are collars which are held between the two rising sides of the respective connecting members 65, and through which the aforementioned respective pivot pins 61, 63 and 64 extend. Indicated at numeral 67 is a bearing which is mounted on the outer circumference of each of the collars 66.

The operation of the embodiment thus constructed is as follows. Cylinder 18 of shock absorber 17 is received in the outer cylinder 15 in a manner to move up and down and is biased at its upper end to return downwardly by the action of the compression spring 49. As a result, the steering skis 13 can move up and down together with the cylinder 18 along the center axis of the shock absorber 17. During this movement, the spacing between the steering arm 50 and the bracket 30 is so varied that the links 60 and 62 are accordingly turned about their respective pivot pins 61, 63 and 64. Incidentally, since the pivot pins 61, 63 and 64 are arranged at a right angle with respect to the center axis of the shock absorber 17, those links 60 and 62 swing in a plane extending on that particular center axis (i.e., in a parallel plane with the drawing surface of FIG. 2) so that the steering angle of skis 13 do not vary even if the links 60 and 62 swing up and down.

Now, if the steering handle 52 is turned, the steering arm 50 is also turned through the steering lever 54, the tie rod 55 and the ball joint 51 in this order. These rotations of the steering arm 50 are then transmitted to the bracket 30 through the two links 60 and 62. Since the bracket 30 can be turned independently of the cylinder 18 by the actions of the bearings 28 and 29, the bracket 30 and the skis 13 are turned together in accordance with the rotations of the steering handle 52 without rotating cylinder 18.

The embodiment thus far described is equipped with the shock absorber 17 acting as a strut, which is held on the chassis 1 in a manner to move up and down and to the lower end of which the steering skis 13 are mounted in a manner to rotate clockwise and counter-clockwise so that it can be said to have a construction in which the present invention is applied to the so-called strut type suspension system. However, the illustrated embodiment is not a limitation on the invention. It is sufficient according to the present invention that the steering skis are mounted in the aforementioned manner to the lower end portion of the supporting member which in turn is mounted to the chassis 1 in a manner to move up and down and which is biased to return downward. The supporting member thus constructed can be suspended by a variety of suspension systems. For example, the present invention can be applied to various suspension systems including the systems of the trailing arm type, the leading arm type and the double wishbone type, all which are commonly employed in a snowmobile. Incidently, although the cylinder 18 and the plain bearings 19 and 20 in the foregoing embodiment have a cylindrical shape, they are not limited to such shape but can be modified to have partially or wholly angled corners.

According to the aforementioned embodiment, moreover, since the steering arm 50 received in the outer cylinder 15 and the links 60, 62 and 63 are used to transmit the turning force of the steering handle 52 to the steering skis 13, the cylinder 18 can have its lower exposed portion protected against being struck by obstacles during the running operation of the snowmobile, with the resultant advantage that it can hardly be hurt.

As has been described hereinbefore, according to the present invention, since the steering skis are mounted to the lower end of the supporting member in a manner to rotate clockwise and counter-clockwise, the supporting members need not be turned with them. There is therefore established no frictional resistance in the rotations between the supporting member and the chassis during the turning operation of the steering handle. As a result, the steering handle can be operated with a reduced force. Thus, the handling can be lightened so that the fatigue of the driver during the running operation can be accordingly lightened.

This invention is not to be limited by the embodiment shown in the drawings and described in the description, which is given by way of example and not of limitation, but only in accordance with the scope of the appended claims.

I claim:

1. In a snow vehicle having a chassis, a biased-downwardly extending support member including a plunger member capable of extension and retraction along a steering axis, and a steering ski, said support member mounting said steering ski to said chassis, the improvement comprising: bearing means interposed between said ski and said plunger rotatably mounting said steering ski to said support member for steering rotation around said steering axis, without restraint against rotation around said steering axis, and means for turning said steering ski around said steering axis.

2. Apparatus according to claim 1 in which said support member is not rotatable.

3. Apparatus according to claim 1 in which said means for turning said steering ski comprises a rotatable steering arm and a knuckle, said knuckle being rotatable by said arm around said support member, said knuckle being connected to said bearing in such a manner as to permit said ski to move toward and away from said chassis, without changing the steering angle of said steering ski.

4. Apparatus according to claim 1 in which said support member is a downwardly biased retractible strut, said bearing means being mounted to the lower end of said strut.

5. Apparatus according to claim 4 in which said means for turning said steering ski comprises a rotatable steering arm and a knuckle, said knuckle being rotatable by said arm around said support member, said knuckle being connected to said bearing in such a manner as to permit said ski to move toward and away from said chassis, without changing the steering angle of said steering ski.

6. Apparatus according to claim 1 in which said bearing means is a thrust bearing which permits relative rotation around said steering axis, and resists thrust along said steering axis.

7. Apparatus according to claim 4 in which bearing means is a thrust bearing which permits relative rotation around said steering axis, and resists trust along said steering axis.

* * * * *